United States Patent [19]
Eschweiler, Jr. et al.

[11] 4,068,946
[45] Jan. 17, 1978

[54] DOCUMENT FEEDING APPARATUS

[75] Inventors: Earl E. Eschweiler, Jr., Norwalk; Richard B. Smith, Ridgefield, both of Conn.

[73] Assignee: Pitney-Bowes, Inc., Stamford, Conn.

[21] Appl. No.: 682,572

[22] Filed: May 3, 1976

[51] Int. Cl.$^2$ .................... G03B 27/32; G03B 27/52
[52] U.S. Cl. .................................. 355/64; 270/61 F; 270/79
[58] Field of Search ............... 355/64, 50, 65; 226/110, 61; 270/61 F, 79

[56] References Cited
U.S. PATENT DOCUMENTS

| 3,289,529 | 12/1966 | Darthenay | 355/50 |
| 3,299,772 | 1/1967 | Walter et al. | 355/64 X |
| 3,354,777 | 11/1967 | Normandy et al. | 355/50 X |
| 3,735,975 | 5/1973 | Sukel et al. | 355/50 X |

Primary Examiner—Richard A. Wintercorn
Attorney, Agent, or Firm—Thomas R. FitzGerald; William D. Soltow, Jr.; Albert W. Scribner

[57] ABSTRACT

An apparatus for automatically and incrementally feeding a continuous fan-folded document to be copied having interconnected segments over a bed plate of a flash illumination photocopier for sequentially positioning each document segment on the bed plate. A drive assembly engages and moves the document having a motor supplying motive power to the drive assembly. The motor is coupled to the drive assembly through a clutch that controls the supply of motive power. A brake is coupled to the drive assembly to stop document movement when the clutch is disengaged to position each document segment on the bed plate. A control mechanism automatically engages the clutch and releases the brake to feed a subsequent document segment to the bed plate after a copy run of a given document segment has been completed. Engagement of the clutch and release of the brake is initiated simultaneously with the last flash in the copy of the photocopier illuminating strobe lamps. Subsequently, the control mechanism automatically disengages the clutch and engages the brake when the next document segment is correctly positioned on the bed plate for copying.

16 Claims, 7 Drawing Figures

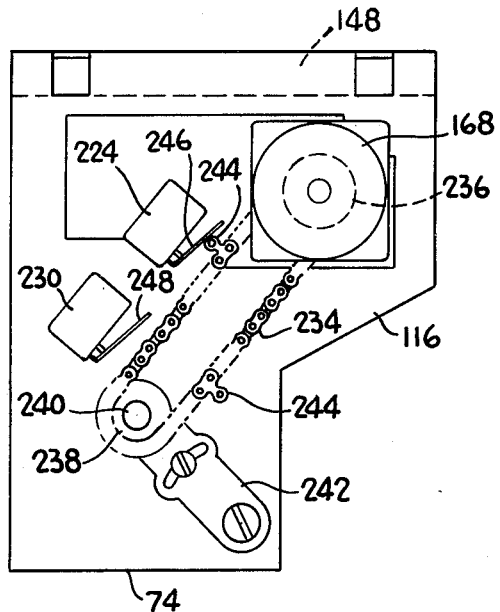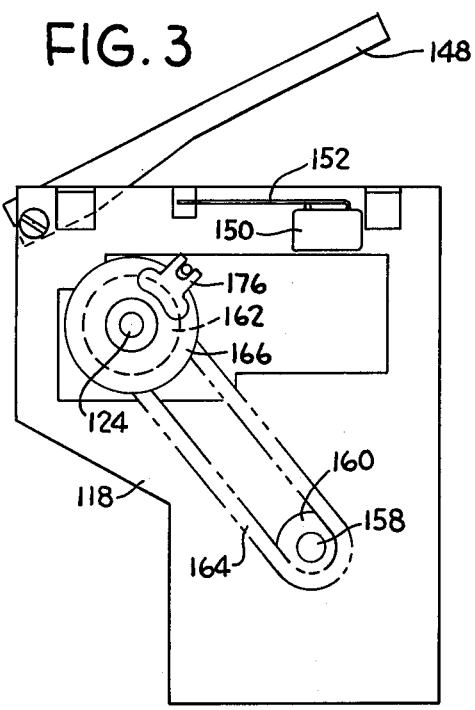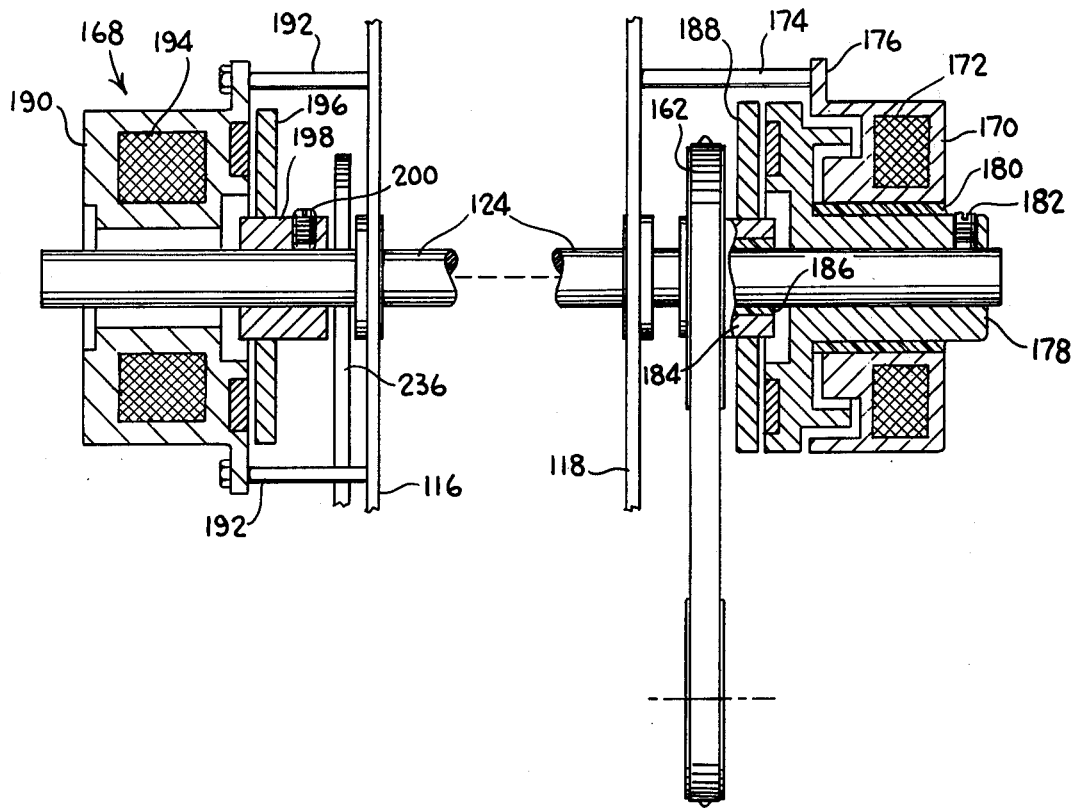

DOCUMENT FEEDING APPARATUS

BACKGROUND OF THE INVENTION

1. Field of the Invention

The present invention relates to an apparatus for automatically and incrementally feeding a continuous fan-folded document having interconnected segments, such as a continuous computer print-out, over a bed plate of an electrostatic flash illumination photocopier. The apparatus also correctly positions each document segment on the bed plate for copying.

2. Description of the Prior Art

For convenience, information tabulated by computer is frequently printed on a continuous form having sequentially arranged segments with the leading edge of each segment separably attached to the trailing edge of the preceding segment. Ordinarily, such continuous forms have a series of drive holes along each edge so that the entire document can be easily handled and driven by machines equipped with a conventional sprocket or tractor drive mechanism.

Because computer tabulated information is often widely distributed, it is desirable to quickly and efficiently provide duplicate copies of fan-folded documents on which the information is printed. Various known methods of form reproduction have certain drawbacks, however. For example, presently available high speed computer printers can make multiple carbon copies but this capability is limited. Generally, the quality of the carbon copies decreases as the number of carbon copies made is increased.

Alternatively, each segment of the continuous document may be separated from the remainder to be photocopied or otherwise duplicated with known office reproducing equipment. However, the time consumed by such a process makes it prohibitively expensive to produce large numbers of copies of long documents. Moreover, once separated, segments of the original document may be lost or incorrectly rearranged making it difficult to later produce additional accurate copies.

Proposals for apparatus which automatically feed a fan-folded document through a photocopier have been made. For example, U.S. Pat. No. 3,446,554, issued to Hitchcock et al, discloses a large complex apparatus for use with a scan-type photocopier which holds only a portion of the document being scanned in stationary position against the photocopier platen or bed plate. A loop is formed between two rollers from the remainder of the document. The rollers advance the loop above the platen while holding the scanned document portion in its stationary position. The Hitchcock et al apparatus is carefully synchronized with the scan-type photocopier so that the portion of the document being scanned does not move during the copying process. Efficiency is achieved by simultaneously advancing one portion of the document while another portion is being copied rather than waiting for the entire document to be scanned and copied before it is advanced.

U.S. Pat. No. 3,804,514, issued to Jasinski, is directed to a dual function document stop for a scan-type photoconductor, but also discloses a pair of feed tractors which intermittently draw a fan-folded document across the photocopier platen. However, no detailed description of the operation of the feed tractors is disclosed in the Jasinski patent.

Neither of the devices disclosed in either the Hitchcock et al and Jasinski patents take advantage of the capabilities of a flash illumination photocopier to achieve high speed reproduction.

U.S. Pat. No. 3,255,662, issued to Call, discloses a machine for microfilming fan-folded documents which includes an automatic document feed mechanism. Linear speeds of both the documennt and the microfilm on which it is projected are synchronized to attain the proper reduction ration of document size to filmed image. However, the document is not incrementally fed through the machine for individual exposure of each document segment.

It is preferable to automatically feed the entire document, intact, through the reproducing equipment used to make the copies. In this manner, the integrity of the original document can be maintained for later copying if necessary, and the time required to complete the reproduction process can be greatly reduced.

The efficiency of such a copy production process may be further enhanced by use of a high speed, flash illumination or full frame exposure-type photocopier which exposes a complete document at one time for projection on a copy sheet. This type of photocopier is generally faster than conventional scan-type machines which illuminate and project successive, incremental areas of the document being copied in a copy sheet.

A flash illumination photocopier, of the type with which the apparatus of the present invention can be used, is disclosed in U.S. Pat. No. 3,738,743, issued to Hoffman et al, assigned to the assignee of the present invention.

SUMMARY OF THE INVENTION

In a preferred embodiment, to be described below in detail, the apparatus of the present invention automatically and incrementally feeds a continuous fan-folded document, having interconnected segments, over a bed plate of a flash illumination or full frame exposure-type photocopier. Further, this apparatus sequentially positions each document segment on the photocopier bed plate for copying. Document feed is initiated simultaneously with the last flash of the photocopier strobe illuminating lamps in a copy run of a given document segment. Document feed is not delayed until the photocopy has been developed and delivered to a collection station to complete the copy run. Therefore, this apparatus is capable of high speed, efficient operation that capitalizes on the advantages offered by flash illumination photocopiers.

Flash illumination photocopiers, with which the apparatus of the present invention is most advantageously used, have an illumination station that includes a flat, transparent bed plate for receiving the document to be copied face down. A plurality of strobe illumination lamps illuminate the document received on the bed plate in addition to a lens and mirror system to instantaneously project the full document image to an imaging station. The imaging station also receives a copy sheet onto which the document image is projected. A flash trigger is tripped by the copy sheet to control flash of the strobe lamps while the sheet is in transit through the imaging section.

The photocopier also has a copy counter, that may be programmed with the number of copies of a single document segment desired to be made in a given copy run, and which generates an end-of-run signal when production of the last copy in the copy run has been initiated.

The feeding and positioning apparatus of the present invention includes a drive assembly which engages the document and moves it over the bed plate. A motor supplied motive power to the drive assembly and is coupled thereto by a clutch which controls the supply of motive power. A brake is also coupled to the drive assembly to stop it from advancing the document when a document segment is appropriately positioned for copying on the bed plate. A control, which is connected to the photocopier flash strigger and the copy counter, initiates engagement of the clutch and release of the brake to feed the subsequent segment of the document to the bed plate when the occurence of two events coincides. In particular, document advance is initiated when the copy counter generates and end-of-run signal, and when simultaneously the flash trigger is tripped energizing the strobe lamps to make the last copy in a given copy run. The control further disengages the clutch and releases the brake when the subsequent document segment is correctly positioned on the bed plate.

The apparatus of the present invention takes advantage of and is fully compatible with the flash illuminating photocopier. The photocopier is capable of high speed operation because a document is exposed in full frame while the copy sheet is in transit through the imaging station. Document advance is initiated by the feeding and positioning apparatus with flash illumination of the document for the last time in a copy run. Therefore, copy time, feed time and, consequently, the overall time required to make copies of an entire document are greatly reduced.

Accordingly, it is an object of the present invention to provide a fan-folded document feeding and positioning apparatus for use with a flash illumination photocopier which initiates advance of the document simultaneously with illumination of a document segment to produce the last copy in a copy run. Thus, this apparatus in conjunction with the flash illumination photocopier, provides a means for making any number of copies of an entire fan-folded document quickly and efficiently.

Other objects, aspects, and advantages of the present invention will be pointed out in, or will be understood from, the following detailed description provided below in conjunction with the accopanying drawings.

BRIEF DESCRIPTION OF THE DRAWINGS

FIG. 3 is a side elevational view of this apparatus showing a portion of the mechanical coupling between the motor and the drive assembly;

FIG. 4 is an elevational view of the side of this apparatus opposite that shown in FIG. 3 illustrating a timing mechansim for signaling the brake and clutch control mechanism at preselected times;

FIG. 5 is a vertical cross-sectional view of the brake and clutch;

DETAILED DESCRIPION OF THE PREFERRED EMBODIMENT

A. The Flash Illumination Photocopier

Figure 1:
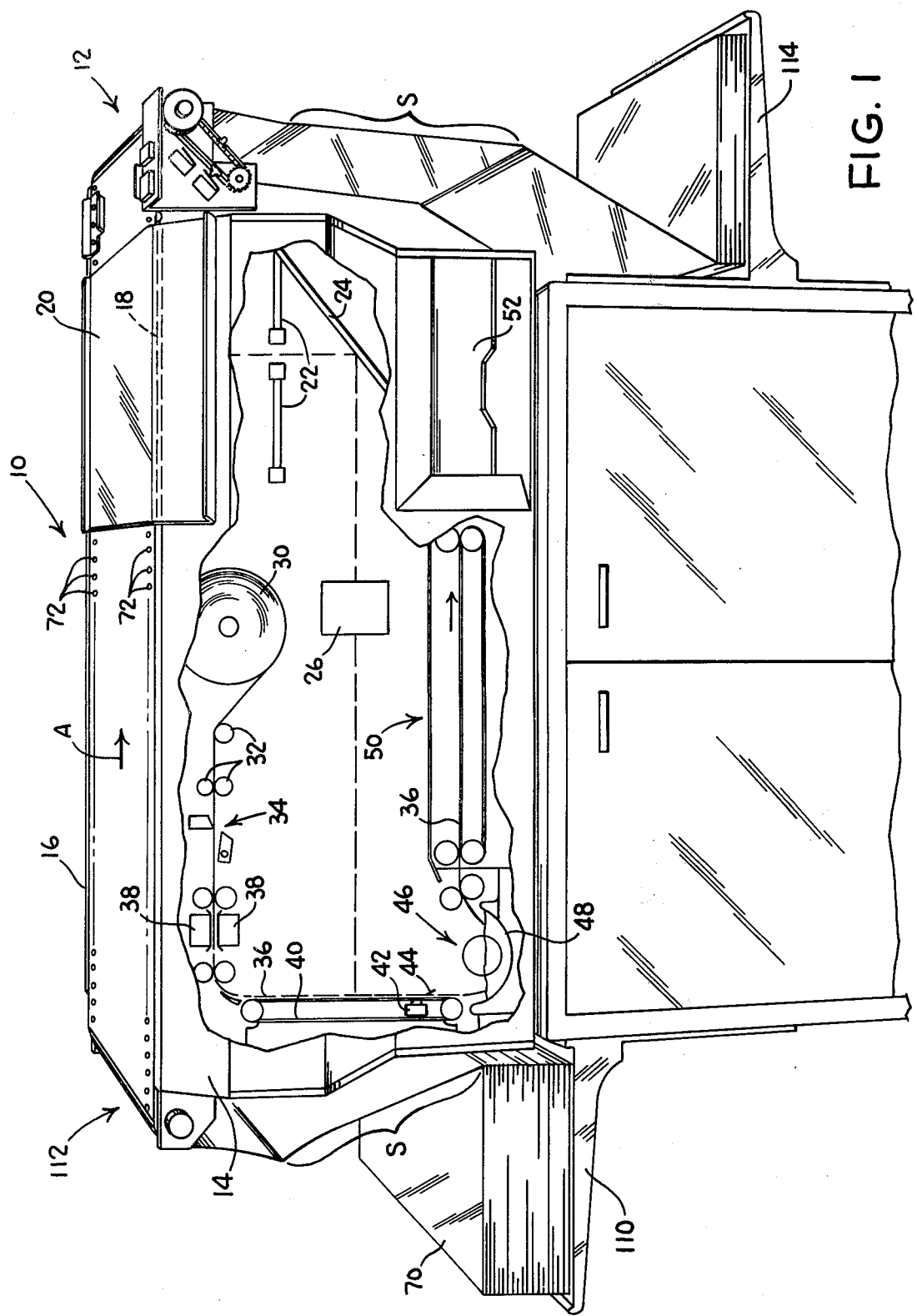
FIG. 1 is a perspective view, partly broken away to show internal detail, of a flash illumination photocopier equipped with the fan-folded document feeding and positioning apparatus of the present invention.

FIG. 1 illustrates a flash illumination photocopier, generally indicated at 10, equipped with a fan-folded document feeding and positioning apparatus, generally indicated at 12, constructed in accordance with the present invention. The photocopier, which may be of the type disclosed in U.S. Pat. No. 3,738,743, issued to Hoffman et al and assigned to the same assignee as this application, has a housing 14 having a flat, generally horizontal top wall 16 that includes a transparent bed plate 18. Bed plate 18 receives a documment to be copied face down. A flexible blanket 20, made from an opaque material, overlies the plate to hold the document in position thereon. A plurality of flash illumination or strobe lamps 22 is mounted in housing 14 to uniformly illuminate the entire document through the bed plate 18. When illuminated, the full document image is reflected in its entirety downwardly to a mirror 24 which redirects it horizontally to a projector lens system 26. From here the document image is projected to an imaging station, generally indicated at 28, where it is received on a copy sheet as will be described below. Copy sheet material, which comprises a photoconductive substance, such as zinc oxide coated on an electrically conductive substrate, for example paper, is fed from a supply roll 30 by a series of rolls 32 to a knife assembly, generally indicated at 34. Here the sheet material is cut to desired length to form individual copy sheets 36 in conventional fashion. Thereafter, the paper is fed through a charging device such as a corona charger 38 which uniformly charges the sheet's photoconductive coating. The charged copy sheet is subsequently fed vertically downwardly to the imaging station where it is received by a transport in the form of a continuously moving endless vacuum conveyor belt 40 that defines an image plane. Air flow effected by a fan which is not shown mounted behind the belt holds the sheet tightly thereto. A flash trigger such as a microswitch 42 connected to the strobe lamps 22 is also mounted behind the conveyor belt 40 and has an actuator finger 44 that projects through the image plane. When the charged copy sheet 36 trips microswitch finger 44, the strobe lamps flash to momentarily illuminate the document. The document image is then projected to the copy sheet correctly positioned to receive it by location of the finger 44 described above. Exposure causes thhe charge on the photoconductive copy sheet coating to dissipate in the non-image areas leaving a latent electrostatic image in the image areas. Because of the instantaneous flash illumination provided by the strobe lamps, the copy sheet may be exposed while in transit through the imaging station on the conveyor belt 40. The document is not scanned while the copy sheet is held in a stationary position in sections but rather is illuminated in its entirety for a short period of time to instantaneously expose it while in motion. From the transport conveyor belt 40, the copy sheet is fed to a developing station, generally indicated at 46, having a developer tank 48 which contains a liquid toner that visibly develops the latent electrostatic image in a well-known manner. Thereafter, the developed copy sheet is fed to a drying station, generally indicated at 50, and is ultimately delivered to a collection tray 52. If desired, other image developing techniques such as dry developing techniques may be used with such a flash illumination type photocopier.

Figure 6:
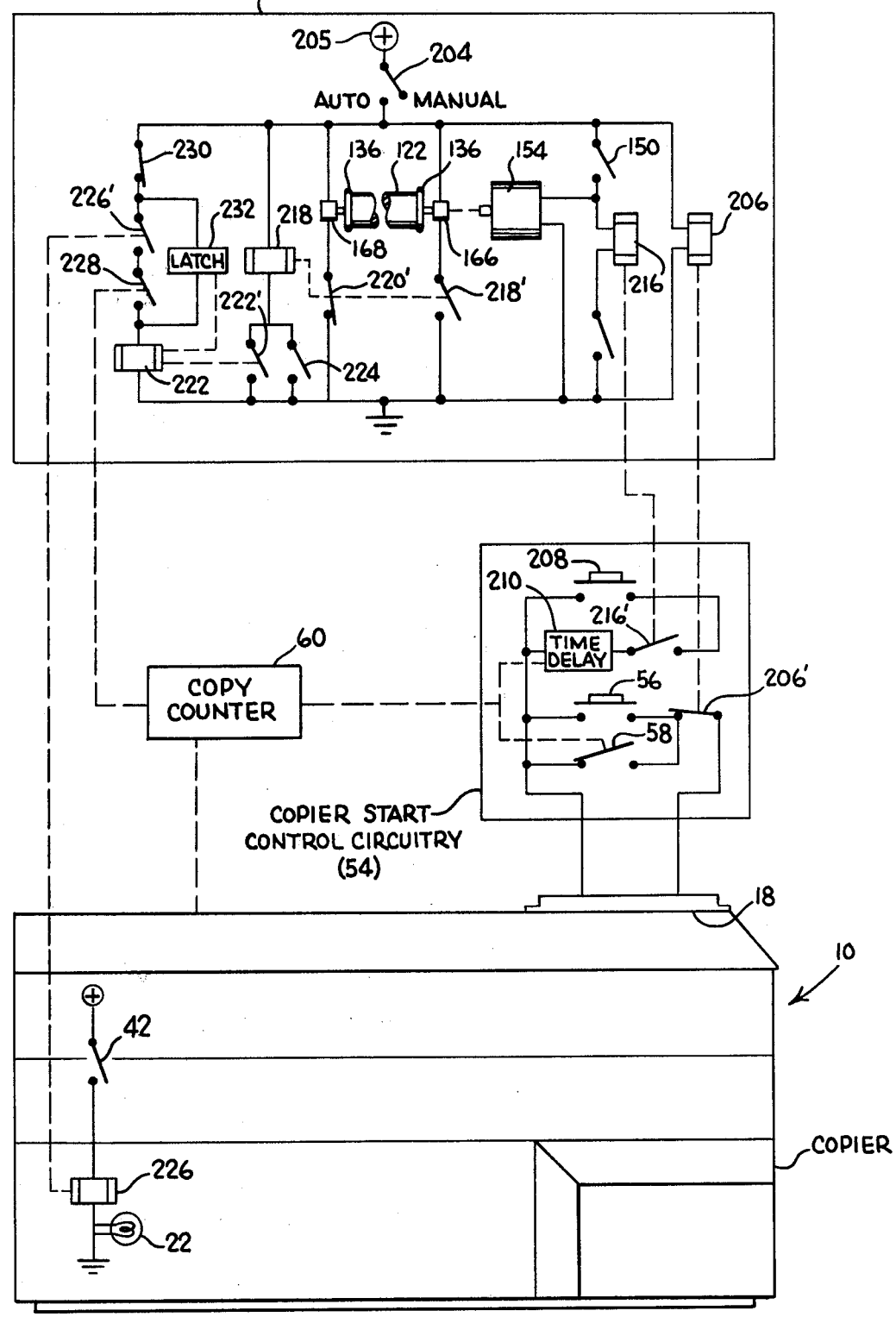
FIG. 6 is a schematic diagram of the photocopier, feeding, positioning circuitry of the present invention.

FIG. 6 shows schematically the photocopier being equipped with start control circuitry 54 having a normally open start print button 56 that, when closed, initiates a copy run, and a by-pass switch 58. A copy counter 60, that may be programmed with the desired number of copies in the copy run, closes by-pass switch 58 after the copy run has been initiated to continue copier operation during the run. The counter further generates an end-of-run signal which opens the by-pass switch 58 when the production of the last copy in a run has been initiated to subsequently stop the copying process. Further, the photocopier may be equipped with a collator or sorter apparatus for automatically sorting multiple copies of a multi-page document.

B. The Automatic Fan-Folded Document Feeding and Positioning Apparatus

As shown in FIG. 1, the automatic fan-folded document feeding and positioning apparatus 12 is modular in construction which may be easily installed on the right side of the flash illumination photocopier 10 as an accessory thereto. The apparatus is designed to handle a continuous fan-folded document 70, such as a computer print-out, the folds of which divide the document into sequential segments S. Ordinarily, the folds are perforated so that the document segments can be separated from one another. Two rows of large diameter perforations 72 are further conventionally disposed on each edge of the document and may be engaged by sprockets or toothed tractors of document handling apparatus. Document handling equipment is also installed on the photocopier in conjunction with the feeding and positioning apparatus including a document support tray 110 for holding the fan-folded document from which it is fed, a guide roll assembly 112 mounted on the left side of the flash illumination photocopier 10, and a document collection tray 114 mounted beneath the feeding and positioning apparatus 12. The feeding and positioning apparatus 12 pulls the document 70, which is positioned by guide roll assembly 112, across the flat top wall 16 of the photocopier 10 and between the blanket 20 and bed plate 18 in the direction of the arrow A. After it is copied, the document is fed downwardly to the collection tray 114 where the document's natural folds cause it to neatly assume the same rectangular stack configuration which it originally had.

Figure 2:
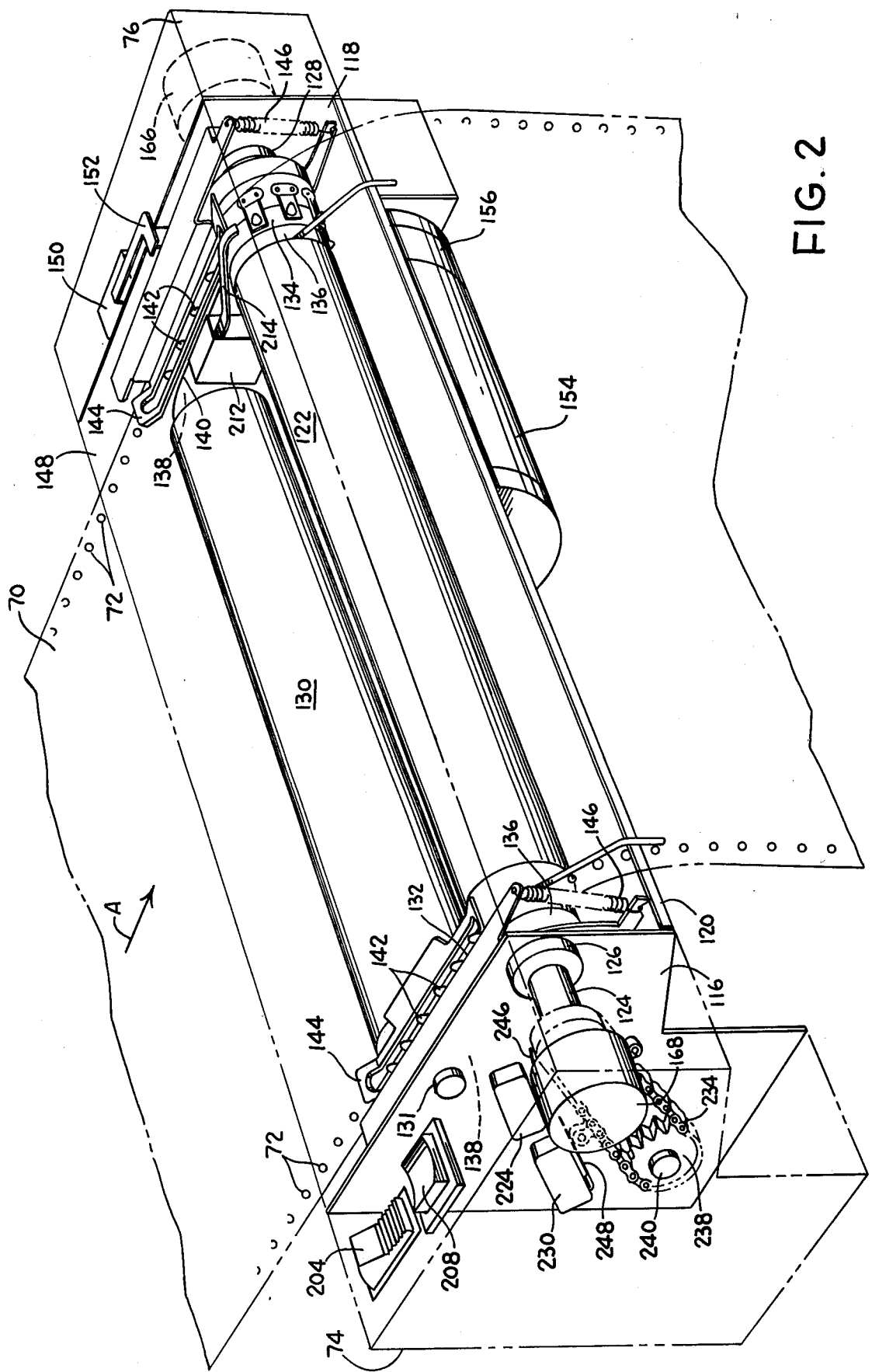
FIG. 2 is an enlarged perspective view of this fan-folding document feeding and positioning apparatus.

FIGS. 2 through 4 show the feeding and positioning apparatus including a main frame having end support brackets 116 and 118 with a generally horizontal bottom wall 120 spanning the distance between the brackets. A drive assembly housed in the frame has a drive roll 122 mounted for rotation with a main shaft 124 which is journaled in antifriction bearings 126 and 128 fixed to end brackets 116 and 118 respectively. Both ends of shaft 124 extend beyond the end brackets. A support roll 130 is mounted for rotation with a second shaft 131 also journaled in antifriction bearings which are not shown fixed to the end brackets. Both the support and drive rolls 130 and 122 respectively support a fan-folded document fed through the feeding and positioning apparatus, and the drive roll 122 aids the document feeding function. However since it performs only a document supporting function, support roll 130 can be non-rotatively mounted if desired. Two document engaging tractor chains 132 and 134 are carried at opposing ends of the support and drive rolls 130 and 122 respectively.

Each tractor chain is reeved about a drive sprocket 136 mounted for rotation with the drive roll and main shaft, and an idler sprocket 138 mounted for free rotation on the second shaft which is further supported by a backup plate 140 mounted between respective drive and idler sprockets. A plurality of outwardly projecting teeth 142 separated by a standard distance are carried on each tractor chain to engage the edge perforations 72 of document 70. A pair of hold down clips 144 each hinged for pivoted movement on one end bracket 116 and 118 are spring loaded by coil springs 146 to a closed position over the tractor chains to maintain engagement of the chain teeth with the document. A protective transparent plexiglass cover 148 is mounted between end brackets 116 and 118 and is hinged for pivoted movement between a closed position shown in FIGS. 2 and 4 and open document loading position shown in FIG. 3. In the closed position, cover 148 protects the operator from the potential danger of the moving drive assembly. Further, a cover interlock 150 in the form of a miroswitch having an actuator finger 152 is mounted on end bracket 118 to be engaged by the cover when closed. The interlock turns the feeding and positioning apparatus off when the cover is opened as will be described below in detail. Drive roll 122, drive sprockets 136, and tractor chains 132 and 134 are driven by an electric motor 154 mounted in the main frame beneath the bottom wall 120 throughh a suitable reduction gear mechanism 156 having a take-off shaft 158. As shown in FIG. 3, a main drive sprocket 160 is mounted for rotation on take-off shaft 158, and a similar driven sprocket 162 is mounted for rotation on main shaft 124. The drive and driven sprockets 160 and 162 respectively are interconnected by an endless chain 164. An electromagnetic clutch 166 controllably coupled driven sprocket 160 to shaft 124 to control the supply of motive power from the motor to the drive roll and tractor chains. Similarly, an electromagnetic bracke 168 shown in FIGS. 2 and 4 is mounted on shaft 124 at its end opposite the clutch to stop rotation of drive roll 122, and tractor chains 132 and 134. As will be described in greater detail below, the magnetic clutch 166 is signalled to engage and the magnetic brake 152 is signalled to release to feed the document across the bed plate of the photocopier when the photocopier flash trigger 42 is tripped to energize the strobe lamps 22 to produce the last copy of a given document segment in a copy run. It has been found that inertia delays actual engagement of the clutch sufficiently to permit complete exposure of the copy sheet even with the instantaneous initiation of clutch enagement and strobe lamp flash described in detail above. Conversely, the electromagnetic brake is engaged and the magnetic clutch is released when the document is correctly positioned on the bed plate. It is preferable that the document be copied in increments which correspond to the segments S into which it is divided. Accordingly, one segment of the document is positioned on the bed plate and copied. When copying is completed, the document is advanced until the succeeding segment is correctly positioned on the bed plate at which time it too is copied. This procedure is repeatedly followed until the entire document is copied.

FIG. 5 illustrates the clutch and brake in the manner in which they are associated with shaft 124 in greater detail. The clutch 166, which may be of the type manufactured by Electroid Co., 95 Progress St., Union, N.J., Model No. SBEC-17C, includes a main housing 170 in which is encased a coil 172. The housing 170 is held against rotation by a pin mounted in end bracket 118 that engages a V-shaped dog 176 shown in FIG. 3 fixed to housing 170. A rotor 178 is mounted for free rotation in the housing 170, separated therefrom by an antifriction bushing 180, and is fixed to the shaft 124 for rotation therewith by a pin 182. The driven sprocket 162 is mounted for free rotation about shaft 124 on a collar 184 having a similar antifriction bushing 186. A clutch plate 188 is also mounted on collar 184. Prior to energizing coil 172, the rotating driven sprocket floats freely on shaft 124 without transmitting motive power therethough to the shaft. A brake 168, which may be of the type manufactured by Electroid Company Model EC-17B, includes a housing 190 that is non-rotatively mounted relative to end bracket 116 by bolts 192 in which a coil 194 is encased. A brake plate 196 is mounted on a collar 198 that is non-rotatively fixed to shaft 124 by a pin 200. When energized the coil effects a magnetic field which attracts brake plate 196 to housing 190 to stop rotation of the shaft.

FIG. 6 shows the circuit schematic diagram of feed control mechanism 202 which automatically operates the drive assembly described above to feed each document segment of the fan-folded document to the photocopier bed plate which initiates copying of each document segment when correctly positioned thereon. This feed control mechanism includes a mode control switch 204 which, when closed, completes an electrical circuit from a source 205 of current through a mode control relay 206 to ground. A start circuit control switch, in the form of a relay controlled single pole double throw switch 206', which normally connects start print button 56 and holding switch 58 to the photocopier, is shifted thereby to connect a normally open automatic start print button 208 and automatic resettable time delay starting circuit 210 to the photocopier. Accordingly, the start print button 56 is disconnected and no longer operable. The feed control mechanism 202 further includes a normally open end-of-run sensor 212, connected in series with cover interlock 150, which as shown in FIG. 2, is a microswitch having an actuator finger 214 positioned to be contacted by a document loaded in the drive assembly. When paper is loaded and the cover is closed, the actuator finger is depressed to close the end-of-run sensor and complete the circuit to an end-of-run cutout relay 216 which closes a normally open end-of-run cutout switch 216' to connect the time delay 210 in the copier start control circuitry 54. When this end-of-run cutout switch 216' is closed, a copy run by the photocopier may be initiated in either of two ways. First, copying may be initiated by depressing the automatic start print button 208. Alternatively, if the automatic start print button is not depressed, the time delay circuit 210 will automatically start the photocopier after a predetermined period, for example, 3 seconds. The time delay circuit 210 is controlled by the copy counter 60 so that the delay automatically recycles at the completion of a copy run. In particular, a predetermined period, that is 3 seconds, after one copy run has been completed, a succeeding run will be initiated. Motor 154 is connected across the current source 205 through the cover interlock 150 which when closed starts the motor to run.

The feed control mechanism 202 also operates the magnetic clutch 166 and brake 168 to advance and position the document 70 in response to signals received from the flash trigger 42 and the copy counter 60. As shown in FIG. 6, both the clutch and brake are connected to the source of current 205 through two relay controlled switches 218' and 220' which are interconnected so that when one is closed the other is open. Normally when brake switch 220' is closed, clutch switch 218 is open, and the drive assembly is at rest. When the clutch is connected to the source of current and engaged, the brake is disconnected and released to power the drive roll 122 and toothed tractor chains 132 and 134. Conversely, when the brake is connected to the current source and engaged, the clutch is released to stop positive drive of the drive roll and tractor chains.

A feed control relay 218 actuates both the clutch and brake switches and may be energized through either a relay controlled, normally open start fed switch 222', or a length measure switch 224. The start feed switch 222' is controlled by a start feed relay 222 which is energized through a relay controlled, normally open strobe detector switch 226', a normally open repeat cycle switch 228, and a normally closed latch release switch 230. The strobe detector switch is controlled by a strobe relay 226, which is connected in series with the flash trigger 42 and the strobe illumination lamps 22 to close each time the strobe lamps are flashed. The repeat cycle switch is connected to the copy counter 60 to close in response to the end-of-run signal generated thereby. The flash trigger and end-of-run signals are ordinarily pulses. Therefore, a latch 232 is connected across the strobe detector and repeat cycle switches to hold start feed relay in energized condition once energized. For example, the latch may be a simple normally open switch controlled by relay 222 itself. The latch is deenergized by opening the normally closed latch release switch. Length measure switch 224 and latch release 230 are operated by a mechanical timing device, shown in detail in FIGS. 2 and 4, which includes a timing chain 234 reeved about a first sprocket 238 mounted on an idler axle 240 fixed to a pivotable tensioning arm 242. Both of the timing chain sprockets have diameters equal to one half the tractor chain drive sprockets 136 and the timing and tractor chains have equal pitch. Two lobes 244 are fixed to timing chain 234 at symmetrical locations to divide the chain into two equal lengths. Each lobe is positioned to operate actuator fingers 246 and 248 on the length measure and latch release switches 224 and 230 respectively which may be micro-switches mounted on the outer face of end bracket 116. Further, the linear distance between the lobes on the chain is equal to one half the length of a document segment S. Thus, linear movement of the chain from a first position with one lobe in contact with length measure switch actuator finger 246 to a position with the second lobe in contact with that finger moves the document through a linear distance equal to one document segment. Accordingly, the document may be accurately positioned on the bed plate by the interaction of the timing chain lobes with the length measure switch as will be described below in detail. Further, as shown in FIG. 2, housing covers 74 and 76 are provided to enclose the timing mechanism mounted with end bracket 116 and the clutch and drive chain mechanism mounted with end bracket 118. For convenience, the mode control switch 204 and automatic start print button 208 may be mounted in cover 74 so that apparatus 12 retains its modular character.

C. Operation of the Photocopier and Document Feeding and Positioning Apparatus The flash illumination photocopier 10 and document feeding and positioning apparatus 12 operate to copy and feed a fan-folded document in coordinated fashion as follows. A fan-folded document 70 is placed on the document support tray 110 so that the information printed on it will face downwardly when drawn across the flat top wall 16 of the photocopier. The first segment of the document is placed on bed plate 18 and copy counter 60 is programmed with the desired number of copies of the document and, hence, of each document segment to be made. Manual start print button 56 is depressed to initiate the photocopying process. Holding switch 58 is then closed by control of copy counter 60 until released by the end-of-run signal generated thereby when the copy run of the first document segment is complete. The remainder of the document is now ready to be automatically fed, positioned, and photocopied by the apparatus of the present invention operating in conjunction with the flash illumination photocopier.

Figure 7:
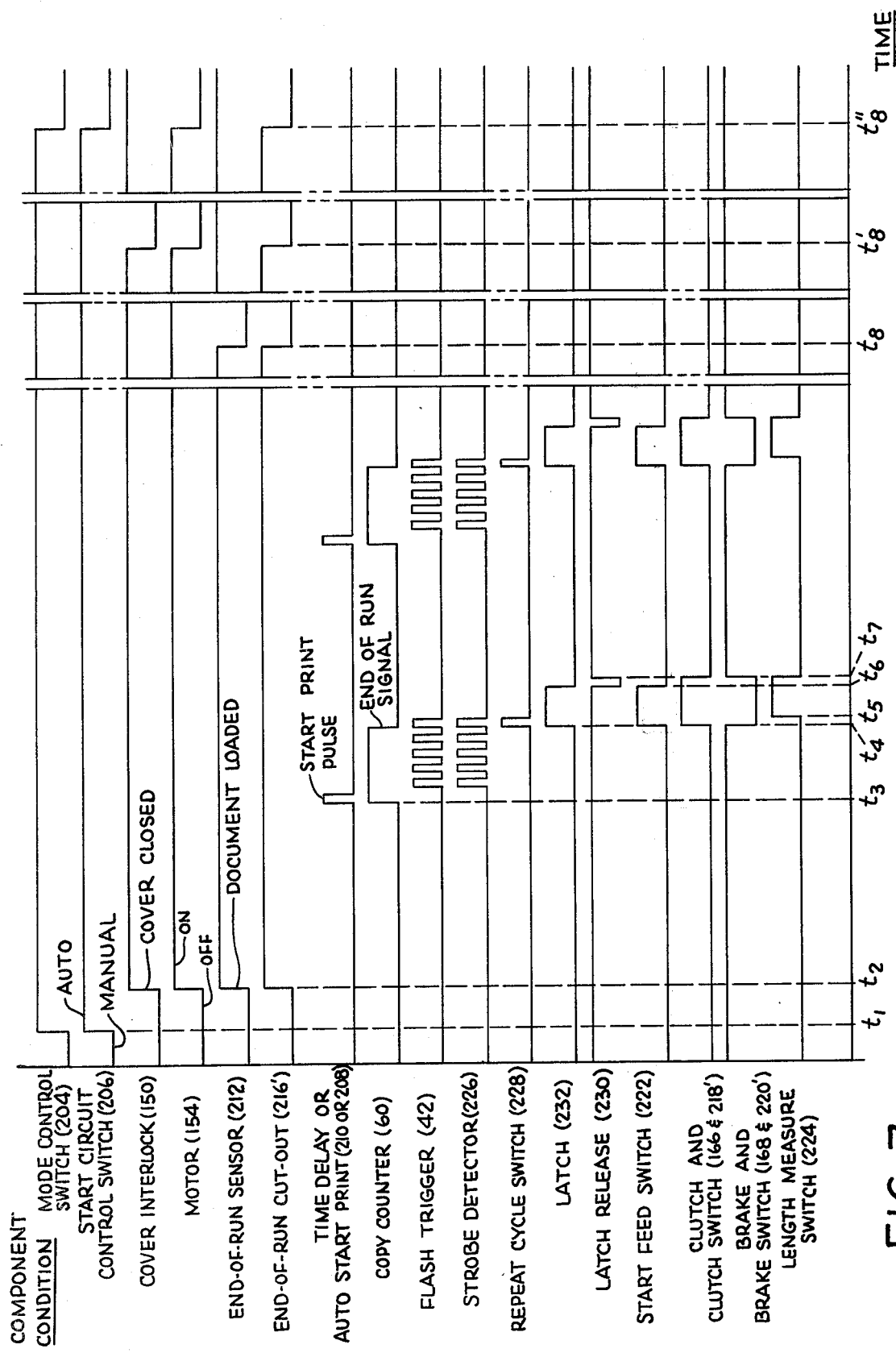
FIG. 7 is a timing diagram illustrating the sequence of operation of the various components of the apparatus of the present invention.

FIG. 7 shows a timing diagram from which automatic operation may be described wherein the active or closed and inactive or open condition of the various components is indicated by the illustrated waveforms. At time $t_1$, the mode control switch 204 is turned from its manual to its automatic position shifting relay controlled start circuit control switch 206' from its manual to its automatic position. The document is then manually pulled across top wall 16 until the second document segment is correctly positioned over bed plate 18. The loading portion of the document, namely the first document segment, is threaded into the feeding and positioning apparatus 12 by lifting the cover 148, lifting the hold-down clips 144, and engaging the perforated document edges on toothed tractors 132 and 134.

At time $t_2$, the cover is closed to close over interlock 150. Further, the document rests on actuator finger 214 of end-of-run sensor 212 closing it also. Accordingly, motor 154 is started and relay controlled end-of-run cutout switch 216' is closed. At time $t_2$, the remaining components of the feed control mechanism are in the following conditions. One lobe 244 on timing chain 234 rests against actuator finger 246 of normally closed length measure switch 224 holding it open. Latch release switch 198, which is not in contact with a timing lobe, is closed. Flash trigger 42 is open, strobe detector relay 226 is deenergized, and strobe detector switch 226' is open. Similarly, repeat cycle switch 228 is open since an end-of-run signal has not yet been generated by the copy counter 60. Accordingly, start feed relay 222 is deenergized, start feed switch 222' is open, and feed control relay 218 is deenergized. Therefore, clutch switch 218' is open to disengate the clutch 166, and brake switch 220' is closed to engage the brake 168. The document is held in a stationary position when threaded in the feeding and positioning apparatus 12.

At time $t_3$, 3 seconds after the cover 148 is closed, a delay introduced by the time delay circuit 210 or after depression of the automatic start print button 208, a pulse is generated which causes the photocopier to initiate the photocopying process. Simultaneously, the copy counter 60 is set to begin its count. The cycle shown in FIG. 7 is for five copies. Therefore, the flash trigger 42 is closed five times by passing copy sheets, and in synchronism, the relay controlled strobe detector 226' is closed five times.

At time $t_4$, when production of the fifth copy in the copy run of the document segment has been initiated, copy counter 60 generates an end-of-run signal to close repeat cycle switch 228. Simultaneously, strobe detector 226' and latch release 230 are closed to complete the circuit to feed control relay 222. Start feed switch 222' is closed and latch 232 is activated to hold the relay 222 in energized condition. Furthermore, feed control relay 218 opens brake switch 220' to release brake 168 and closes clutch switch 218' to engage clutch 266, coupling motor 154 to drive roller 122, and tractor chains 132 and 134. Accordingly, document feed begins at time $t_4 + \Delta t$, $\Delta t$ being a small period caused by the inertia of the mechanical components of the system.

At time $t_5$, shortly after document feed has been initiated, the timing chain 234 travels sufficiently to move one lobe 244 off of the actuator finger 246 of length measure swtich 224 thus closing it. The feed control relay 218 is thus energized through two independent circuits.

At time $t_6$, as the document continues to advance one lobe 244 on the timing chain 234 trips latch release actuator finger 248 to open the latch release 230, and deenergize start feed relay 222 to open start feed switch 222'. Feed continues until that lobe reaches the actuator finger 246 of normally closed length measure switch 224 to open it at time $t_7$.

At time $t_7$, both circuits which energize feed control relay 218 are then opened allowing clutch switch 218' to return to its normally open condition disengaging the clutch and allowing brake switch 220' to return to its normally closed condition engaging the brake. Thus, document feed stops.

The time delay circuit 210 which was reset by the end-of-run signal from copy counter 60 automatically initiates the photocopying process of the third document segment which is now positioned over bed plate 18. The entire cycle is subsequently repeated as described above.

A suitable time delay interposed by time delay circuit 60 is 3 seconds. The feeding and positioning apparatus is permitted to energize, advance the document one segment, position the second segment and come to rest. The total time requied for actual document feed is approximately 0.8 seconds.

Automatic operation to feed and position the fan-folded document may be stopped in three different ways as shown in FIG. 7.

At time $t_8$ when the document has been completely copied and fed through the feeding and positioning apparatus, end-of-run sensor 212 opens deenergizing end-of-run cutout relay 216 to open-end-of-run cutout switch 216'. Thus, neither the time delay nor the normally open automatic start pring button completes a circuit to start another copy cycle. If trouble occurs in feeding and positioning apparatus at time $t_8'$, the cover 148 may be opened. This operation opens cover interlock 150 which turns motor 154 offf to stop the feeding apparatus.

Finally, automatic feed may be stopped at time $t_8''$ by turning the mode control switch 204 from its automatic to its manual position.

The apparatus of the present invention functions to start feed of a continuous fan-folded document substantially simultaneously with last flash of the strobe lamps in a given copy run. This result flows from the fact that both start feed and flash are controlled by the same means, namely, the flash trigger 38. Insignificant delay is introduced between completing of one copy run and feed of the continuous document to the subsequent segment for start of another. Accordingly, the apparatus of the present invention functions to efficiently and automatically feed a document through a flash illumination photocopier with minimum loss of time. Further, this apparatus is not complex, and may be of modular construction for easy installation on existing flash illumination photocopiers.

Although a specific embodiment of the apparatus of the present invention has been described above in detail, it is to be understood that this is for purposes of illustration. Modifications may be made to the desired fan-folded document feeding and positioning apparatus by those skilled in the art in order to adapt it to particular applications.

What is claimed is:

1. An apparatus for automatically incrementally feeding a continuous fan-folded document having interconnected segments over the illuminating station bed plate of an electrostatic photocopier and for sequentially positioning each segment of the document on the bed plate to be photocopied; said apparatus comprising:
   A. drive means for engaging the document and advancing it over the photocopier bed plate;
   B. a motor for supplying motive power to said drive means;
   C. clutch means through which said motor is coupled to said drive means for controlling the supply of motive power thereto;
   D. brake means coupled to said drive means for stopping said drive means from advancing the document over the photocopier bed plate;
   E. feed control means electrically connected to the photocopier to be signalled thereby
      1. for engaging said clutch means and releasing said brake means when copying of a given segment of the document is completed to feed the next segment of the document to the photocopier bed plate, and
      2. for engaging said brake means and releasing said clutch means when the next document segment is positioned on the photocopier bed plate and
   F. lobe means connected to said feed control means to control the feeding of the next segment of said document.

2. The fan-folded document feeding and positioning apparatus as claimed in claim 1 further comprising: means for automatically signalling the photocopier to initiate copying of the next document segment when positioned on the bed plate.

3. The fan-folded document feeding and positioning apparatus as claimed in claim 2 wherein said automatic signalling means comprises is a time delay means for delaying initiation of copying of the next document segment for a period sufficient for said feeding and positioning apparatus to correctly position the next document segment on the bed plate.

4. The fan-folded document feeding and positioning apparatus as claimed in claim 1 wherein said feed control means comprises:
   A. timing means actuated by said drive means to be driven thereby through a cycle corresponding to feed of one document segment;
   B. at least one lobe element means fixed to said timing means to move a linear distance substantially equal to the length of a document segment when said timing means moves through a cycle; and
   C. length measure switch means mounted to be actuated by said lobe element at the conclusion of a timing means cycle to engage said brake means and release said clutch means when the next document segment is positioned on the photocopier bed plate.

5. The fan-folded document feeding and positioning apparatus as claimed in claim 1 further comprising: means for automatically stopping the photocopier and said feeding and positioning apparatus when the entire document has been copied.

6. The fan-folded document feeding and positioning apparatus as claimed in claim 1 further comprising:
   A. cover means for shielding said drive means, movable between paper loading and drive means shielding positions; and
   B. interlock means for turning said feeding and positioning apparatus off when said shielding means is in the paper loading position.

7. In a flash illumination photocopier having an illumination station including a bed plate for receiving a document to be copied; flash illumination means for illuminating the document received on the bed plate; projection means for projecting the full document image; an imaging station for receiving a copy sheet onto which the document image is projected by said projection means; a flash trigger for flashing said illumination means while the copy sheet is in transit through the imaging station; and copy counter means, programmable with the number of copies of a single document desired to be made in a copy run, for generating an end-of-run signal when production of the last copy in the copy run has been initiated; an apparatus for automatically and incrementally feeding a continuous fan-folded document having interconnected segments over the bed plate and for sequentially positioning each document segment on the bed plate to be copied, said apparatus comprising:
   A. drive means for engaging said document and advancing it over the bed plate;
   B. a motor for supplying motive power to said drive means;
   C. clutch means through which said motor is coupled to said drive means for controlling the supply of motive power thereto;
   D. brake means coupled to said drive means for stopping said drive means from advancing the document;
   E. control means connected to the photocopier flash trigger and copy counter means
      1. for engaging said clutch and releasing said brake to feed the subsequent segment of the document to the bed plate when the copy counter means generates said end-of-run signal and substantially simultaneously with flash of said illumination means by the flash trigger to make the last copy of the copy run, and
      2. for engaging said brake means and releasing said clutch means when the subsequent document segment is positioned on the bed plate; and
   F. cover means for shielding said drive means, movable between a paper loading and drive means shielding position.

8. The fan-folded document feeding and positioning apparatus as claimed in claim 7 wherein said control means comprises:

time delay means for automatically starting a copy run of a document segment at a predetermined time after the document segment is positioned on the bed plate.

9. The fan-folded document feeding and positioning apparatus as claimed in claim 8 wherein said time delay means is connected to the copy counter means, and is reset by the end-of-run signal generated thereby to delay initiation of a copy run for a period sufficient for said feeding and positioning apparatus to feed the next document segment to and position it on the bed plate.

10. The fan-folded document feeding and positioning apparatus as claimed in claim 8 wherein said control means further comprises:
an end-of-run cutout sensor for interrupting said time delay means to prevent initiation of a copy run by the photocopier after the entire document has been copied.

11. The fan-folded document feeding and positioning apparatus as claimed in claim 7 further comprising:
a cover interlock for turning off said feeding and positioning apparatus when said cover means is moved to the paper loading position.

12. The fan-folded document feeding and positioning apparatus as claimed in claim 7 wherein said control means further comprises:
single feed control means for said clutch means and brake means, arranged to
  A. engage said clutch means when said brake means is released to feed the document, and
  B. engage brake means when said clutch means is released to position the document.

13. The fan-folded document feeding and positioning apparatus as claimed in claim 12 wherein said control means further comprises:
  A. a start feed switch connected to said feed control means to feed the document when closed, and
  B. a start feed actuator, connected to said start feed switch, including:
    1. a flash sensor connected to the flash trigger for detecting each operation thereof to flash the illumination means; and
    2. a repeat cycle sensor connected to the copy counter means for receiving the end-of-run signal; said flash and repeat cycle sensors being interconnected to close said start feed switch when the end-of-run signal is received and the flash trigger is simultaneously operated, indicating that production of the last copy in a copy run of a given document segment has been initiated.

14. The fan-folded document feeding and positioning apparatus as claimed in claim 13 wherein said control means further comprises:
latch means for holding said start feed switch closed after the end-of-run signal has been received and the flash trigger has been simultaneously operated; and
latch release means for opening the latch to open the start feed switch prior to the positioning of the subsequent document segment on the bed plate.

15. The fan-folded document feeding and positioning apparatus as claimed in claim 14 wherein said control means further comprises:
a length measure switch also connected to said feed control means to feed the document when closed and associated with said drive means to close after document feed has been started and open when the subsequent document segment has been positioned on the bed plate;
whereby document feed is started when said start feed switch is closed by said start feed actuator and held closed by said latch means, and
whereby document feed is stopped to position the subsequent document segment on the bed plate when said length measure switch is opened after said latch means has been opened by said latch release means to open said start feed switch.

16. The fan-folded document feeding and positioning apparatus as claimed in claim 15 wherein said latch release means is a switch and wherein said control means further comprises:
a timing chain coupled to said drive means to be driven therewith through a cycle;
at least one lobe element fixed to said timing chain to move a linear distance substantially equal to the length of a document segment when said timing chain is driven through a cycle;
said latch release, and length measure switches being mounted to be operated by said lobe element.

* * * * *